United States Patent
Kim et al.

(10) Patent No.: US 11,010,442 B2
(45) Date of Patent: May 18, 2021

(54) SYSTEMS AND METHODS FOR INTELLIGENCE DELIVERY

(71) Applicant: Outlier AI, Inc., Oakland, CA (US)

(72) Inventors: Michael Kim, Oakland, CA (US); Jacob Topper, Oakland, CA (US); Mark Phuong, Oakland, CA (US); Douglas Mitarotonda, Oakland, CA (US)

(73) Assignee: Outlier AI, Inc., Oakland, CA (US)

( * ) Notice: Subject to any disclaimer, the term of this patent is extended or adjusted under 35 U.S.C. 154(b) by 0 days.

(21) Appl. No.: 17/014,112

(22) Filed: Sep. 8, 2020

(65) Prior Publication Data

US 2021/0073304 A1 Mar. 11, 2021

Related U.S. Application Data

(60) Provisional application No. 62/897,169, filed on Sep. 6, 2019.

(51) Int. Cl.
*G06F 16/9535* (2019.01)
*G06N 20/00* (2019.01)
*G06N 7/00* (2006.01)
*G06F 16/2457* (2019.01)

(52) U.S. Cl.
CPC .... *G06F 16/9535* (2019.01); *G06F 16/24578* (2019.01); *G06N 7/005* (2013.01); *G06N 20/00* (2019.01)

(58) Field of Classification Search
CPC ...... G06F 16/288; G06F 16/7867; G06F 8/20; G06F 16/9535; G09B 5/00; H04L 12/282; G06Q 10/0633; G06Q 30/0254
See application file for complete search history.

(56) References Cited

U.S. PATENT DOCUMENTS

| | | | |
|---|---|---|---|
| 9,152,708 B1* | 10/2015 | He | G06F 16/7867 |
| 9,817,827 B2 | 11/2017 | Gomez et al. | |
| 9,858,275 B1 | 1/2018 | Tomkins et al. | |
| 10,460,255 B2 | 10/2019 | Nagaraju et al. | |
| 2006/0288227 A1* | 12/2006 | Kalofonos | H04L 12/282 |
| | | | 713/182 |
| 2008/0162268 A1 | 7/2008 | Gilbert | |
| 2010/0235467 A1 | 9/2010 | Dowlatkhah | |
| 2011/0126171 A1* | 5/2011 | Neal | G06F 8/20 |
| | | | 717/113 |
| 2013/0073390 A1 | 3/2013 | Konig et al. | |

(Continued)

FOREIGN PATENT DOCUMENTS

WO  2016032777 A1  3/2016

OTHER PUBLICATIONS

"Model Selection", Wikipedia, Aug. 28, 2020, https://en.wikipedia.org/wiki/Model_selection.

(Continued)

*Primary Examiner* — Etienne P Leroux
(74) *Attorney, Agent, or Firm* — Jeffrey Schox

(57) ABSTRACT

A system and method for selecting tailored information to present to a subscriber, including receiving subscriber data, determining an analysis set based on the subscriber data, extracting abstract parameters from the subscriber data, selecting an analysis from the analysis set based on a general model and the abstract parameters, and presenting the selected analysis to the subscriber.

20 Claims, 9 Drawing Sheets

(56) References Cited

U.S. PATENT DOCUMENTS

| | | |
|---|---|---|
| 2013/0151570 A1 | 6/2013 | Sandoval et al. |
| 2014/0129299 A1* | 5/2014 | Daya .................. G06Q 10/0633 |
| | | 705/7.41 |
| 2014/0258282 A1 | 9/2014 | Piantino et al. |
| 2016/0034588 A1* | 2/2016 | Hyatt .................... G06F 16/288 |
| | | 707/733 |
| 2017/0048297 A1 | 2/2017 | Funge et al. |
| 2017/0185256 A1* | 6/2017 | Bennett .................... G09B 5/00 |
| 2018/0032883 A1 | 2/2018 | Sullivan et al. |
| 2018/0189828 A1* | 7/2018 | Luce .................. G06Q 30/0254 |

OTHER PUBLICATIONS

International Search Report and Written Opinion for application No. PCT/US20/049654 dated Nov. 20, 2020.

* cited by examiner

SYSTEMS AND METHODS FOR INTELLIGENCE DELIVERY

CROSS-REFERENCE TO RELATED APPLICATIONS

This application claims the benefit of U.S. Provisional Application No. 62/897,169, filed 6 Sep. 2019, which is incorporated in its entirety by this reference.

TECHNICAL FIELD

This invention relates generally to the data-intensive complex computing architecture field, and more specifically to a new and useful system and method in the data-intensive complex computing architecture field.

BACKGROUND

In the normal course of operations, entities create considerable to very large amounts of electronic data resulting from their operations. In some cases, the amount of electronic data generated can be in the tens of thousands to millions of units of data per day thereby resulting in extremely large data sets (e.g., big data), which can be unstructured and structured. Using big data platforms, some of these entities seek to leverage their big data to obtain beneficial insights and this is done, mainly, by utilizing the big data platform to store the large volume of data and organize the data in a format that is searchable via queries.

A challenge with this model of using the big data platform, however, is that in order to obtain the useful insights that the entities envisions to obtain, analysts and other users of the big data platform must be able to run appropriate queries against the data in the platform. Thus, in such a model, the insights may only be useful if the queries against the data are good.

To assist in the use of big data platforms, some software applications are implemented in big data platforms to analyze the incoming data. In such instances, to determine useable data, these applications apply substantial analysis against each unit of datum of incoming data, organize the data, and potentially run automated queries thereon to provide insights or information to the administrator. However, analyzing each unit of datum of these very large datasets in this manner usurps significant computing resources and in turn, delays the data processing and insight determination due to overuse of the computer processors, memory, and other technical computing elements of the big data platform. Further, there is no guarantee that the queries generated by the software applications will, in fact, identify useable data and return useful insights.

Thus, there is a need in the data-intensive complex computing architecture field to create new and useful systems, methods, and apparatuses to be implemented in a data-intensive complex computing architecture for processing big data, identifying useful data, and generating meaningful and exploratory intelligence therefrom that may further be based on machine learned subscriber preferences. The embodiments of the present application provide such new and useful systems, methods, computer program products, and apparatuses.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2:
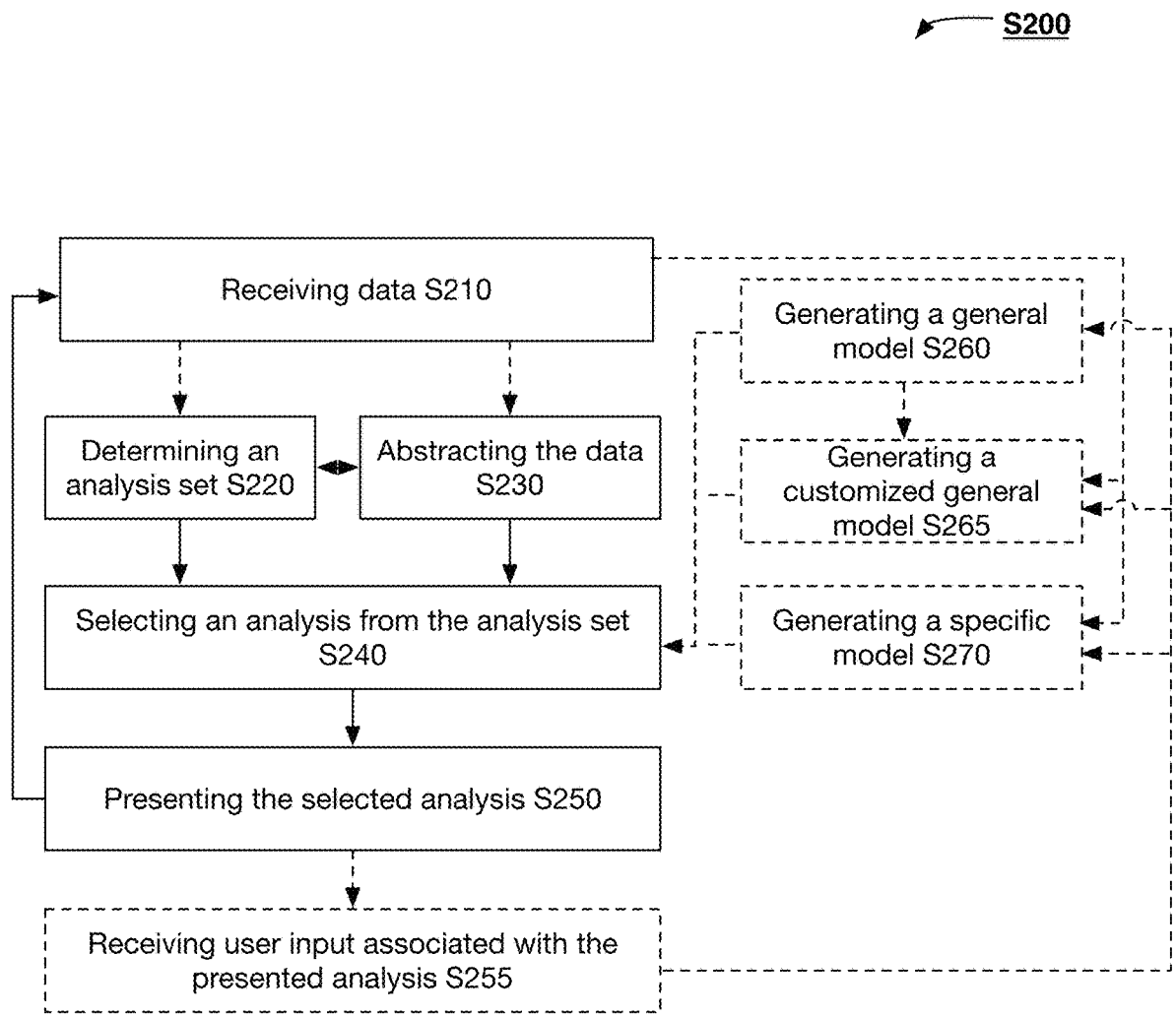
FIG. 2 illustrates a schematic representation method in accordance with one or more embodiments of the present application.

As shown in FIG. 2, the method S200 can include receiving data S210, determining an analysis set S220, abstracting the data S230, selecting analysis from the analysis set S240, and presenting the selected analysis S250. The method can optionally include generating a general model S260, generating a customized general model S265, generating a specific model S270, monitoring the model(s), and/or any steps.

Figure 1:
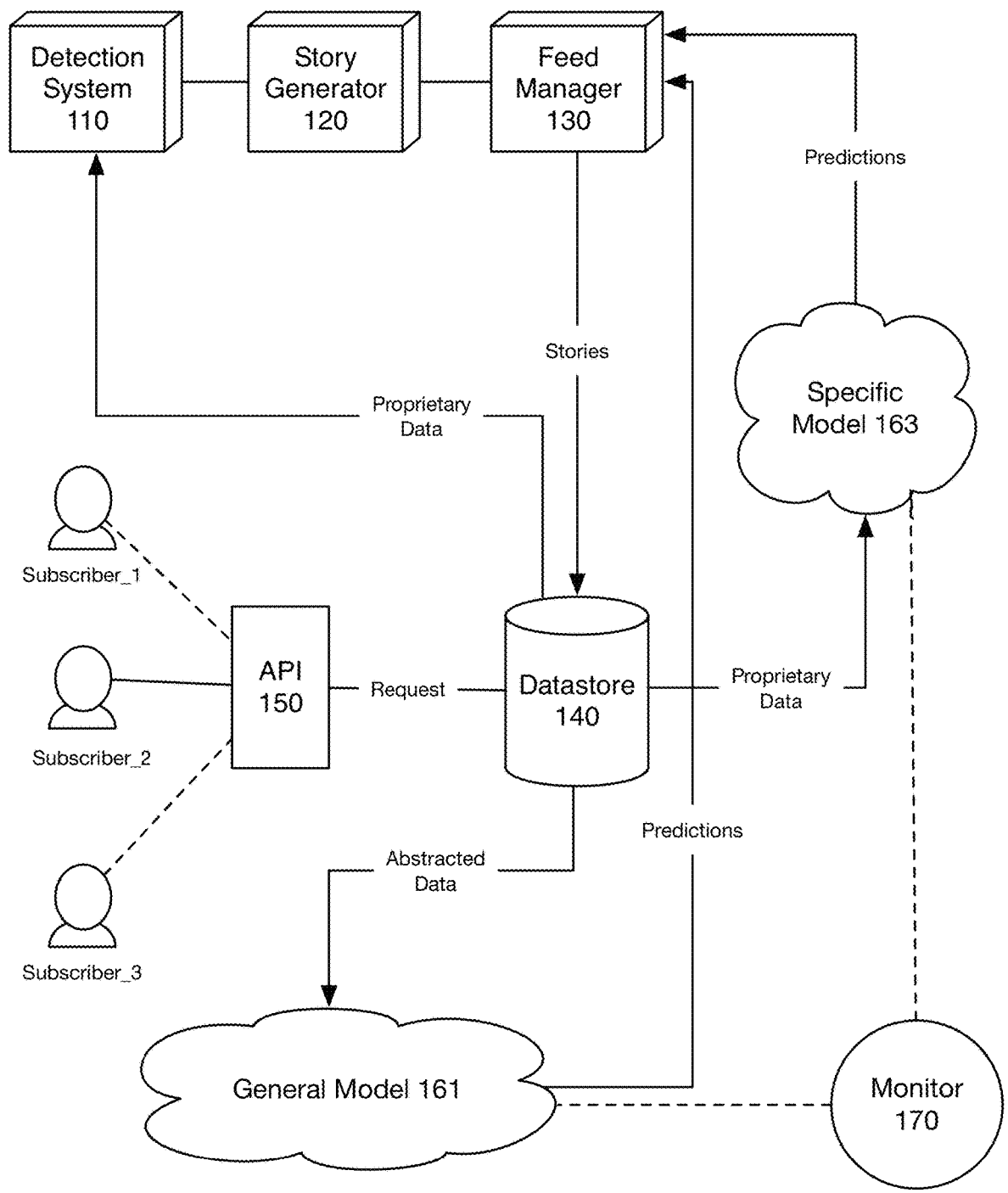
FIG. 1 illustrates a schematic representation of a system in accordance with one or more embodiments of the present application.

As shown in FIG. 1, the system 100 can include a detection system 110, a story generator 120, a story feed manager 130, a datastore 140, an application programming interface (API) 150, a modelling system 160, a model monitor (monitor) 170, and/or any components.

Embodiments of the system and method preferably function to select and present tailored information to one or more users. The tailored information is preferably information (e.g., analyses of or associated with subscriber data) that the user(s) are anticipated to be more likely to interact with, but can correspond to any information. For example, a user associated with a user class that favors a particular geographical area (for example, a sales manager working with the pacific northwest region of America) might be more likely to be presented information related to the states of Washington and Oregon than information relating to other states. However, the tailored information can correspond to any information.

Figure 6:
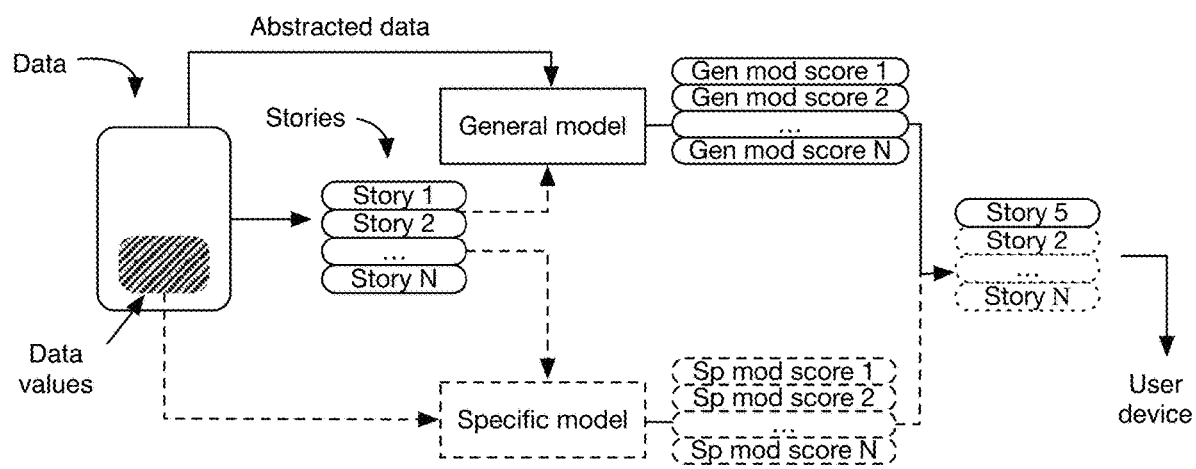
FIG. 6 is a schematic representation of a data flow in accordance with one or more embodiments of the present application.

In an illustrative example as shown in FIG. 6, the method can include: receiving data associated with an entity (e.g., subscriber); determining a set of stories (e.g., an analysis set) based on the data; extracting abstract parameters from the data; selecting a story from the set of stories based on a general model and the abstract parameters; and presenting the selected story to a user or user view associated with the entity. The abstract parameters are preferably anonymized such that the data cannot be (or at least cannot easily be) associated with a given entity. The general model is preferably generated from abstract parameters extracted from data associated with a plurality of entities, stories for each of the plurality of entities, and user interactions with the stories for each of the plurality of entities. As more data and user interactions are collected for a given entity, the method can optionally include generating entity-specific selection models based on the entity's data and the entity's story interactions, wherein the entity-specific models are used in lieu of, or in addition to, the general model to select the story for entity presentation. However, the method can include any suitable steps.

2. Benefits.

Variations of the technology can confer several benefits and/or advantages.

First, the Applicant has discovered that many subscribers (e.g., customers, accounts, entities, etc.) have similar interests. Therefore, using the experiences of one subscriber can facilitate enhanced analysis selection and presentation to other subscribers. As different subscribers typically do not (and do not want to) share data with one another, the Applicant has found that a challenge with doing this is ensuring that each subscriber's data remains anonymous to other subscribers. Applicant has discovered that selecting the stories to present using abstracted parameters (e.g., by abstracting the data) can help ensure that data is more likely to remain anonymous to other subscribers while also enabling improved selection of and presentation of analysis to one or more users.

However, variants of the technology can confer any other suitable benefits and/or advantages.

3. System.

As shown in FIG. 1, an intelligence system 100 can includes a detection system 11o (e.g., an anomaly detection system), a story generator 120, a story feed manager 130, a datastore 140, and an application programming interface (API) 150, a modelling system 160, and a model monitor (monitor) 170. In specific embodiments, the intelligence system and/or components thereof can operate in a manner as described in in U.S. Pat. No. 10,313,466, filed 30 Sep. 2016 entitled 'SYSTEM, APPARATUS, AND METHOD TO IDENTIFY INTELLIGENCE USING A DATA PROCESSING PLATFORM' or U.S. patent application Ser. No. 16/392,874 filed 24 Apr. 2019 entitled 'SYSTEM, APPARATUS, AND METHOD TO IDENTIFY INTELLIGENCE USING A DATA PROCESSING PLATFORM', each of which is incorporated herein in its entirety by this reference. The intelligence system and/or one or more components of the intelligence system can be implemented in a platform domain (e.g., a client operated by an intelligence service operator or provider), a subscriber domain (e.g., a client controlled or hosted by a subscriber), distributed between a platform domain and a subscriber domain, and/or in any suitable domain. The platform domain preferably transmits the general model (e.g., a trained general model) to the subscriber domain, but can additionally or alternatively transmit scores (e.g., associated with an analysis of the analysis set, wherein the model input values can be determined at the subscriber domain and transmitted to the platform domain), the analysis set, the customized general model, specific model, other models, abstracted data, data (e.g., public data, subscriber data, etc.), and/or any suitable content to the subscriber domain. The subscriber domain can transmit subscriber data, abstracted data, the specific model, the customized general model, scores, the analysis set, public data, no data, and/or any content to the platform domain.

The intelligence system is preferably shared across multiple subscribers (e.g., wherein all subscriber data is analyzed by the same instances of different modules); alternatively, a different intelligence system instance can be used for each subscriber (e.g., to promote proprietary data security), or specific modules can be replicated for each subscriber while other module instances are shared (e.g., datastores 140 and story generators 120 are replicated, but the story feed manager 130, modelling system 160, and model monitor 170 are shared). However, the intelligence system can be otherwise allocated to different entities.

In one or more embodiments, the intelligence system 100 may be implemented by a distributed network of computers (e.g., the cloud or the like) and/or by one or more computer processing circuits and the like. Preferably, the intelligence system 100 may be a cloud-based system. However, the intelligence system can additionally or alternatively be implemented on a local computing system, implemented in an edge computing system, and/or be implemented on any suitable computing systems. Additionally, or alternatively, the intelligence system 100 may enable the implementation of an intelligence service that provides intelligence services to one or more subscribers (e.g., subscribers, entities, etc.) to the intelligence service having one or more accounts with the service. Accordingly, the intelligence system 100 may sometimes be referred to herein as the intelligence service 100.

Figure 5:
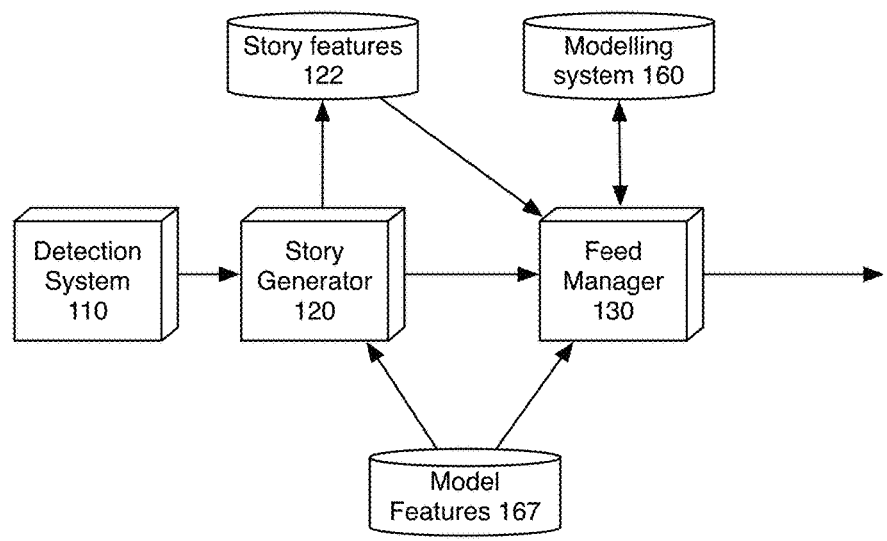
FIG. 5 illustrates exemplary interactions between a detection system, story generator, and feed manager through story features and model features in accordance with one or more embodiments of the present application.

In one or more embodiments, the modelling system 160 (e.g., machine learning system) may function to generate and/or deploy one or more models (e.g., machine learning models) including: a general model 161 (e.g., a global machine learning model, global probability distribution model), a customized general model 162, a specific model 163 (e.g., specific machine learning model, specific probability distribution model), and/or any suitable models. As shown for example in FIG. 5, the modelling system is preferably communicably coupled to the feed manager and the monitor, but can additionally or alternatively be coupled to a datastore, story generator, detection system, API, and/or any components. The models can be generated, trained, and/or updated once, with a predetermined timing (e.g., every day, week, month, quarter, year, etc.), responsive to a trigger (e.g., a model update trigger, a threshold amount of data collection, threshold number of user interactions with stories, a change in a market, etc.), randomly, based on a monitor of the general model, and/or with any timing.

Figure 4A:
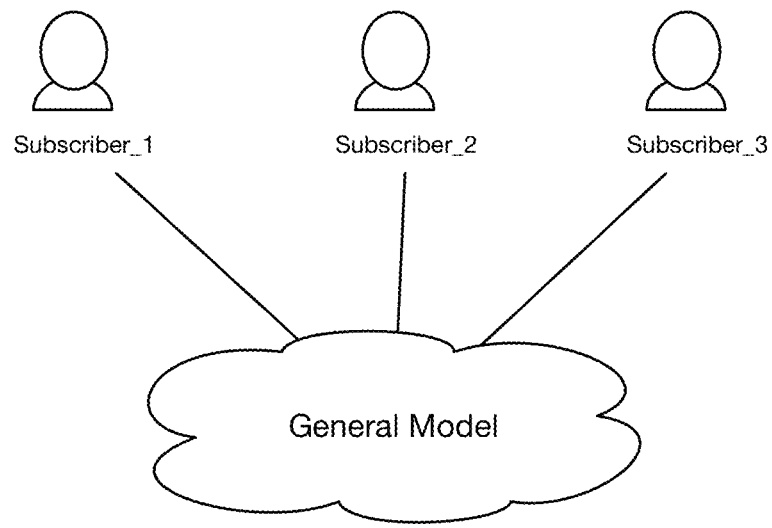
FIGS. 4A and 4B illustrate schematic representations of a relationship between a plurality of distinct subscribers and a general model and the plurality of subscribers and a specific model, respectively, in accordance with one or more embodiments of the present application.

The models, as implemented by the modelling system 160, may include a singular model and/or an ensemble of predictive models dedicated to informing an operation of the story feed manager 130 for one or more subscribers to the intelligence service 100 (for example as shown in FIG. 4A). Examples of operations of the story feed manager can include: which stories to present, an ordering for stories to presenter, story classes to present, order for story classes to present, and/or any suitable operation of the story feed manager, wherein the story feed manager can select, order, present, or otherwise operate based on the model outputs (e.g., scores per story or story class).

The general model 161 is preferably shared across multiple subscribers, and functions to guide story selection for each of a plurality of users (e.g., can be used to select stories for all or substantially all subscribers). The system can include a shared general model 161 for: all or substantially all subscribers to the intelligence service; for each group of subscribers that share common parameters (e.g., same business vertical, same industry, same geographic location, same revenue structure, same subscriber class, same view type, etc.); and/or any other suitable set of subscribers.

The general model is preferably generated (e.g., trained) and/or initialized using data, preferably abstracted data, associated with a plurality of subscribers, the analysis set corresponding to the plurality of subscribers (e.g., subscribers' stories or features thereof), and the interactions of the plurality of subscribers with their respective analysis set. When the system includes general models specific to a subscriber group, the general model can be generated based on the data, stories, and respective user interactions from subscribers within the subscriber group. However, the general model can be otherwise generated.

The general model preferably accepts abstract data as an input (e.g., model feature(s) 167), and does not accept (proprietary) data as inputs. However, the general model can additionally or alternatively accept proprietary data, story features (e.g., feature values from the specific story), and/or other information as an input. The general model can output one or more: analysis selections (e.g., selects a story), analysis scores (e.g., score for each story), information class selections (e.g., selects a story type), analysis class scores (e.g., score for the story type), a new analysis (e.g., a new story), or any other suitable output. When the general model is used to select a story for a given subscriber, the abstract data is preferably generated solely from the subscriber's proprietary data, but can optionally include abstract data from other sources (e.g., public sources, other subscribers' data).

In a preferred embodiment, the modelling system can update and/or customize the general model to generate a customized general model. The customized general model is preferably subscriber specific (e.g., one or more different customized general models are generated for each subscriber), but can be customized for a user class, subscriber class, and/or for any suitable user(s). The customized general model can be generated by training or updating the general model using data (e.g., abstracted data, analysis set, interactions, etc.) for a single subscriber. However, the customized general model can be otherwise generated and/or used.

The customized general model preferably only accepts abstract data as an input, but can additionally or alternatively accept proprietary data, story features 122, or other data. The customized general model can output one or more: analysis selections or scores, analysis class selections or scores, new analyses, or any other suitable output.

Figure 4B:
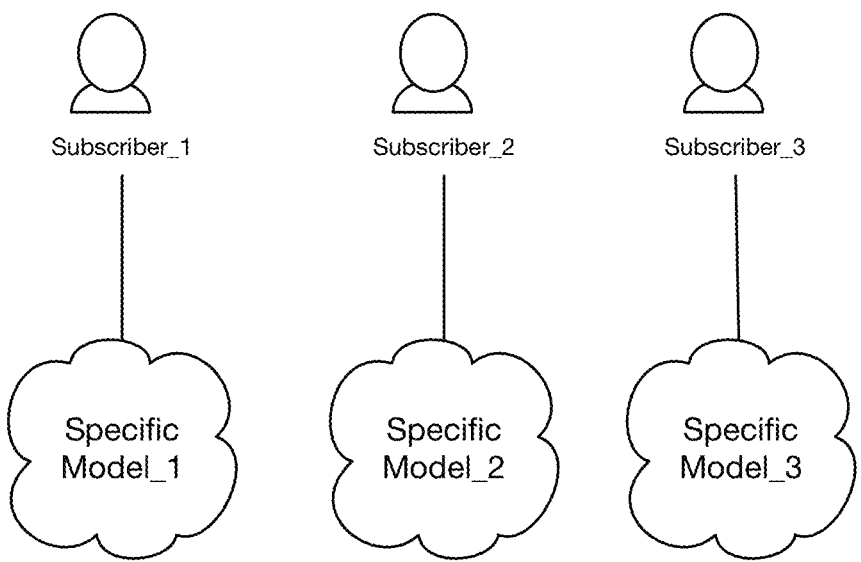

In a preferred embodiment, the modelling system can generate and/or update a specific model. The specific model is preferably subscriber specific (e.g., one or more different specific models are generated for each subscriber, for example as shown in FIG. 4B), but can be customized for a user class, subscriber class, and/or for any suitable user set. The specific model can be generated by training a model using data (e.g., subscriber data, analysis set, interactions, etc.) for a single subscriber. When the specific model is specific to a user subset (e.g., user class, view class, etc.), the specific model can be generated based on the subscriber's data and the user subset's interactions. However, the specific model can be otherwise generated and/or used.

The specific model preferably accepts proprietary data as an input, but can additionally or alternatively accept abstract data, story features, or other data. The specific model can output one or more: analysis selections or scores, analysis class selections or scores, new analyses, or any other suitable output. The data used by the specific model is preferably not used by the general model (or customized general model); however, the specific model and general model (or customized general model) can share some or all data. In an illustrative example, the abstract parameters used by the general model to select an analysis of the analysis set are not extracted from the subscriber data used by the specific model to select the analysis of the analysis set. In a second illustrative example, the abstract data used by the general model can be extracted from the subscriber data used by the specific model, wherein the abstract data's variables are different from the subscriber data's variables.

The monitoring module 170 may function to monitor the modelling system 160 and/or the one or more models deployed by the modelling system including, for example, the general model 161, the customized general model 162, and/or the specific model 163. In some embodiments, the monitoring module can correspond to an intelligence system such as disclosed in U.S. patent application Ser. No. 16/392,874 or in U.S. Pat. No. 10,313,466. However, any monitoring module can be used.

The system can be used with data. The data is preferably associated with the subscriber (subscriber data), and is preferably proprietary or confidential to the subscriber (e.g., accessible to the subscriber, such as via a login, but not accessible to other subscribers). Alternatively, the data can be publicly accessible or otherwise accessible. The data can include values for one or more data attributes (e.g., data parameter, data characteristic, data variable, etc.), can be associated with metadata (e.g., with metadata values for each metadata attribute), and/or can be associated with other information. Examples of data include: sales records (e.g., with $100, 3 Jul. 2019, and Richmond, Calif. as the values for the sales price, date, and location attributes, respectively), marketing data, manufacturing data, or other data (further examples described below). Examples of metadata include: timestamp, location, subscriber identifier, change over time, or other metadata.

The system can be used with abstracted data (abstractions, derived data, abstract parameters, etc.). The abstracted data can be calculated, extracted, or otherwise determined from the (proprietary) data. The abstracted data can be determined by the story generator, the data store, a data extractor (e.g., dedicated to the abstracted data variable or feature; a multi-feature extractor; etc.), and/or other module. The abstracted data can include values associated with an abstracted data class (e.g., type, variable, etc.), metadata (e.g., source data identifiers, subscriber identifier, etc.), and/or other information. Examples of abstracted data include: metadata variables, metadata values, dataset characterization (e.g., mean, median, mode, standard deviation, etc.), relationship to the dataset (e.g., deviation, cluster, etc.), data attributes (e.g., the attribute itself, not the associated value), and/or other information.

The system is preferably used by a set of subscribers (e.g., companies, entities, customers, accounts, master accounts, etc.). Each subscriber can be associated with one or more user views or user classes (e.g., user group, such as marketing or sales). Each user class can be accessed by one or more users (e.g., individuals). Each user can be associated with authentication credentials (e.g., login information, 2-factor authentication, etc.) that enables the user to access stories (and optionally data) proprietary to the respective user class or subscriber. However, the system can be used by any other suitable set of users.

4. Method.

A method for providing tailored information can include receiving data S210, determining an analysis set S220, abstracting the data S230, selecting an analysis from the analysis set S240, and presenting the selected analysis S250. The method can optionally include generating a general model S260, generating a customized general model S265, generating a specific model S270, monitor one or more model(s), and/or any steps. The method can be implemented by an intelligence system (e.g., as described above) and/or by any suitable system. The method and/or one or more steps thereof can be performed on a platform client (e.g., a client maintained by an intelligence system operator), a subscriber client (e.g., a client controlled or operated by a subscriber), distributed between a platform client and a subscriber client, and/or at any suitable client(s).

The method preferably functions to select and/or organize analyses from an analysis set to present to one or more users. The tailored (e.g., selected, organized, etc.) information is preferably one or more analysis from the analysis set that the user(s) are predicted to be more likely to interact with (e.g., based on interactions of the user with previous information). However, the tailored information can be new analyses synthesized from the analysis set, analyses that are predicted to exceed a metric (e.g., importance, impact, uniqueness, unexpected, value, etc. metrics), and/or any suitable information. The method preferably generates unique tailored information for each subscriber (e.g., an entity which subscribes to the platform), subscriber class (e.g., a geographic class such as associated with a particular geographic region; a subscriber size; a subscriber field of work; etc.), user class (e.g., marketing, sales, management, technical development, human resources, legal, other teams or subteams associated with one or more department or division, etc.), one or more individuals, and/or with any information recipient. However, the tailored information may be the same for different information recipients and/or information recipient class.

One or more instance of the method and/or steps thereof can be performed simultaneously and/or sequentially. Each instance of the method can use (e.g., process) the same or different sets of data. Each instance of the method can be performed in the same domain (e.g., at the same client) or in different domains (e.g., on different clients).

Receiving data S210 (e.g., generating a first or second corpus of data) preferably functions to collect data associated with and/or of interest to a subscriber. In some embodiments, the data corresponds to anomalous data (e.g., outliers, inflection points, changes, etc.) of the subscriber data. However, the data can correspond to any data. Some examples of subscriber data include: financial data, sales data, marketing data, social media data (e.g., likes, retweets, comments, shares, reviews, etc.), personnel data (e.g., number of sick days used, number of employees taking sick days, number of vacation days used, number of vacation days remaining, new hires, new offboarding events, firing, etc.), technology usage data (e.g., amount of time spent using tool such as capital equipment, software, etc.; number of users using a tool; etc.), competitor data, stock market data, government data (e.g., new laws passed, changes to tax code, etc.), investor data, and/or any suitable subscriber data. The data is preferably collected by the subscriber, but can additionally or alternatively be collected by a service provider (e.g., the intelligence system provider, a data collection agency, etc.), a competitor, another subscriber, a government agency, a legal agency, an investment agency, and/or by any entity. The collected data can be actively or passively generated. The collected data is preferably stored by the datastore 140, but can be otherwise stored. The collected data is preferably stored in a separate data repository from other subscribers' data, but can be stored with other subscribers' data or otherwise stored.

S210 is preferably performed at a subscriber client, but can additionally or alternatively be performed at a platform client and/or at any suitable client. S210 is preferably performed by a detection system, but can additionally or alternatively be performed by a datastore, a story feed manager, a modelling system, a model monitor, and/or by any suitable component.

Generating an analysis set S220 preferably functions to determine a set of information about or based on the data (and/or abstracted data as generated for example in S230). The analyses within the analysis set preferably includes values for each of a set of analysis classes, but can be otherwise characterized. An analysis class can be: an analysis type, story type, observation type, or other analysis class. Examples of analysis classes can include: spike and drop, relationships, trends, milestones, funnels, and/or other classes. The information value can be: data values cooperatively forming the story, data values cooperatively forming the observation, and/or other values. Examples of information values include: a subscriber-specific metric increase or decrease (e.g., story of the spike-and-drop class), a relationship between different areas of a subscriber's business (e.g., story of the relationship class), a trend in the subscriber's data (e.g., story of the trend class), and/or other analyses.

Information for a subscriber is preferably generated from the data values associated with the subscriber (e.g., proprietary data values), but can additionally or alternatively be generated from the abstracted data values generated from the proprietary data, public data, and/or other data.

The analyses in the analysis set can include one or more: stories, unexpected observations (e.g., an outlier), interesting data points (e.g., exceeding a threshold value, exceeding a threshold change in value, a sustained increase relative to a threshold, failing to achieve a threshold value, failing to achieve a threshold change in value, a sustained decrease relative to a threshold, etc.), correlations in the data, trends in the data, a change in a characteristic of the data (e.g., order of magnitude change, change in the variance, change in the skewness, etc.), insights (e.g., as described in U.S. Pat. No. 10,313,466), and/or any information. In an illustrative example, the analysis can include one or more questions that are raised by the data (e.g., a question and/or suggestion for a topic to look in to further). However, the analysis can answer a question, format the data (e.g., graphically), process the data (e.g., extract signals from noise), and/or otherwise be generated from or related to the data.

The analysis set is preferably generated at a subscriber client, but can additionally or alternatively be generated at a platform client and/or any suitable client. The analysis set is preferably generated by a story generator, but can additionally or alternatively be generated by any component of the intelligence system or be otherwise generated.

The analysis set (and/or one or more analysis contained therewithin) is preferably associated with a time span (e.g., time duration). The time span can correspond to: the amount of time that the analysis is (predicted to be) relevant, the amount of time that the analysis is (predicted to be) interesting, the amount time before the analysis (is predicted to) changes, the time the data was acquired, the time the data was processed, a time stamp associated with the data, the time the data is (presumed) valid, a target time (e.g., determined by a subscriber, determined by a platform provider, determined by a data collection service, etc.), a predetermined amount of time (e.g., based on a characteristic of the analyses), a random amount of time, a subscriber preference, based on the user view, a time window associated with a story class, and/or any suitable time span. Examples of time spans include: an hour, 2 hours, 4 hours, half a day (e.g., half a work day), 6 hours, 8 hours, 10 hours, 12 hours, 15 hours, 24 hours, 1 work day, 1 day, 2 days, 3 days, 4 days, 5 days, 6 days, 7 days, 10 days, a fortnight, a month, two months, a quarter, six months, a year, two years, 5 years, a decade, a score, a century, greater than a century, less than an hour, and/or any amount of time therebetween.

In a specific example, the analyses can be generated in the same or a similar manner as identifying intelligence information and insights as disclosed in U.S. Pat. No. 10,313,466 or U.S. patent application Ser. No. 16/392,874. However, the analysis set can be generated in any manner.

Abstracting data S230 (e.g., generating a corpus of data) functions to anonymize the data and/or information so that the data source (e.g., the subscriber) and/or data values are concealed. The data can be abstracted by the feed manager, the datastore, the story generator, the detection system, the modelling system, the monitoring system, and/or by any component of the intelligence system or by any system. S230 is preferably performed in the subscriber domain (e.g., at a subscriber client), but can additionally or alternatively be performed in the platform domain and/or in any suitable domain. The abstracted data (e.g., abstract parameters) can correspond to, be extracted from, and/or be generated from the subscriber data, the analyses, data extracted from the analyses (e.g., titles, length, etc.), and/or any suitable data.

Examples of abstracting the data can include one or more of: transforming the data (e.g., rounding; Fourier transformation; convolution; mathematical operations such as addition, multiplication, subtraction, division, etc.; etc.), removing or obscuring one or more aspect of the data (e.g., removing a data label, randomizing a data label, randomizing a data value, etc.), data suppression, data generalization, encryption, data randomization or pseudorandomization, normalization (e.g., normalized based on time span, number of employees, number of subscribers, subscriber class, number of vendors, number of consumers, etc.), and/or otherwise abstracting the data. In an illustrative example, numerical data can be abstracted by determining a change (e.g., in magnitude, in order of magnitude, sign such as increase or decrease, percent change, etc.) in the data value (e.g., relative to an adjacent data point, relative to the same data point at a different time, etc.). In a second illustrative example, abstracted data can correspond to determining a bin the data value fits in such as an order of magnitude (e.g., rounding the data value to the nearest order of magnitude), a predetermined bin, logarithmic bin (e.g., relative to any suitable base), and/or otherwise.

In some variants of the invention, the abstracted data can be associated with one or more shape, facet, and/or attribute of the set of data and/or the analyses. In related variants, the abstracted data can be associated with and/or include metadata of or about the data.

In an illustrative example, the abstracted (e.g., derived) data is derived from, but does not explicitly include, the data (e.g., does not explicitly include the data values, data types, data format, etc.). However, the abstracted data can include (e.g., explicitly, implicitly) the data.

Selecting one or more analysis from the analysis set S240 functions to select a subset of information to display to one or more viewers (e.g., users, user class, subscriber, etc.), but can alternatively function to select the ordering for the information (e.g., information prioritization), or otherwise influence information presentation to the user. The selected analysis is preferably tailored information (e.g., information which the viewer would like to view, needs to view, is more likely to interact with, etc.), but can be any or all of the information from the analysis set. In a preferred embodiment, the information is tailored for a user class (e.g., a team, division, department, group, etc. of, within, or associated with the subscriber). A subscriber can be associated with any number of user classes and as such can have any number of tailored information views. Examples of user classes can include: management, marketing, technical development, software, hardware, legal, human resources, information technology, operations management, finance, and/or any suitable user classes. However, the information can be tailored for a user, a subscriber, and/or any suitable viewers.

The selected analysis is preferably selected by a feed manager 130 and/or a modelling system, but can additionally or alternatively be selected by any component of an intelligence system and/or any suitable system. The information is preferably selected at a subscriber client, but can additionally or alternatively be selected at a platform client and/or any suitable client.

The selected analysis is preferably selected using one or more models. The models can be general models, customized general models, subscriber specific models, and/or any suitable model(s). Each model that is used can be general, subscriber specific, user class specific, geographic region specific, time span specific, user specific, subscriber class specific, subscriber group specific (e.g., used for a plurality of subscribers), and/or be applicable to any set or subset of viewers or subscribers. However, the selected analysis can additionally or alternatively be selected according to subscriber preferences, user preferences, time (e.g., time of creation, time since information was last viewed, etc.), information content (e.g., information type), and/or based on any suitable characteristics of the information. General models, including customized general models, preferably use abstracted data as the input, but can use any suitable data as inputs. Specific models preferably use subscriber data (e.g., including confidential data) as inputs, but can additionally or alternatively use abstracted data or any suitable data.

When a plurality of models is used, the inputs to each model are preferably not identical to nor derived from the same source. In an illustrative example, the inputs to a general model (or customized general model) correspond to abstracted data and the inputs to a specific model correspond to subscriber data (e.g., not abstracted data). In this illustrative example, the subscriber data processed by the specific model is preferably not used to generate the abstracted data processed by the general model. However, the inputs to each model may be the same, derived from the same data, and/or use any suitable data.

Each model is preferably trained (e.g., generated) using a training set of data. The training data preferably correspond to a training analysis set and a corresponding set of subscriber interactions to the training analysis set. The training data for the general model is preferably generated by a plurality (or all) subscribers. The training data for the specific model and the customized general model are preferably generated by a specific subscriber. However, any model can be trained using any training data.

One or more models preferably corresponds to a set of probability distributions (e.g., a pre-determined set of learned probability distributions), but can additionally or alternatively correspond to a neural network, a nearest neighbor approach, a decision tree or decision forest, a set of rules and/or heuristics, and/or any suitable model type. When a plurality of models is used, each model is preferably, but does not have to be, the same type of model. In an illustrative example, training the models can correspond to determining probability distribution shapes, weights, relationships, and/or otherwise correspond to determining a relationship between model parameters, data inputs, and a score associated with an analysis of the analysis set. The probability distributions of the set of probability distributions can be represented graphically (e.g., histogram), by a table, by an equation (e.g., probability density function, probability mass function, cumulative distribution function, etc.), and/or be otherwise represented.

Figure 8:
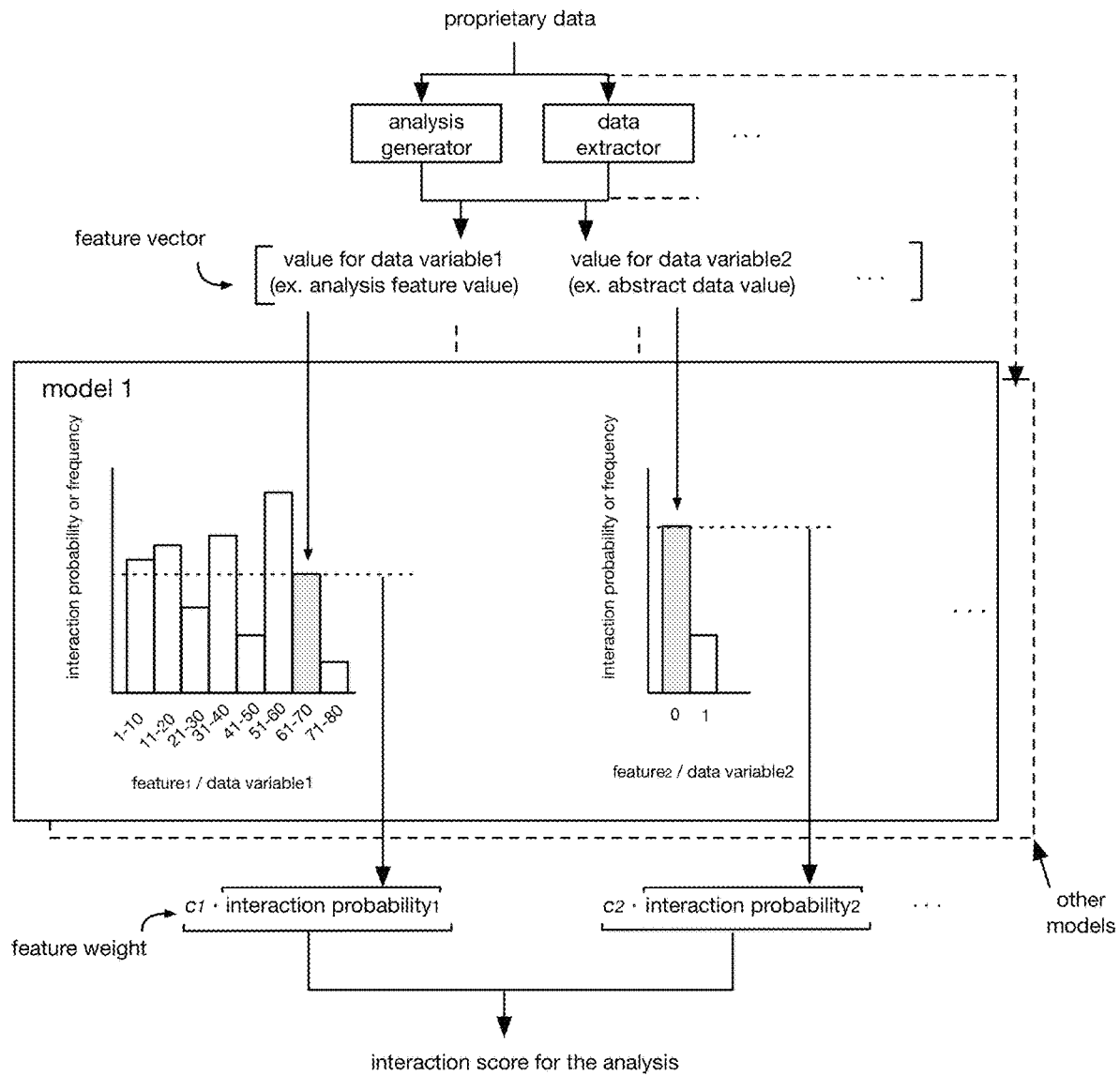
FIG. 8 is a schematic representation of a first illustrative example of a model used to generate an interaction score for an analysis.

In a specific example (example shown in FIG. 8), each model can include a set of probability distributions, each associated with a different data variable (e.g., abstract data variable or model feature; subscriber data variable; etc.). The probability distribution for a data variable can encode interaction frequencies or probabilities (e.g., determined from historical interaction frequencies) for different values of the data variable, and can optionally encode noninteraction frequencies for different values of the data variable. The data variable can be continuous or binary; the values for continuous features can be segmented into bins (e.g., predetermined increments, percentiles, etc.) or otherwise managed. The data variables included in the model (e.g., data variables for which probability distributions are generated) can be: automatically determined (e.g., using another model that identifies the most influential data variables), manually determined, and/or otherwise determined. The timeframe encompassed by each probability distribution is preferably the same for probability distributions within the same model, but can alternatively be different. The timeframes can be manually determined, automatically determined (e.g., based on when a threshold amount of data available, when the data stabilizes and has less than a threshold proportion of outliers, etc.), and/or otherwise determined. Alternatively, the model can include: a single probability distribution encoding interaction and/or noninteraction frequencies with each of a plurality of values for each of a plurality of data variables; or be otherwise constructed.

Different models of the same type can include probability distributions for the same features (different variables), but differ in the underlying data (and therefore, interaction probability per variable value). Alternatively, different models of the same type can include probability distributions for different features (data variables), probability distributions for the same number of features (e.g., such that the scores from individual probability distributions do not have to be weighted), and/or be otherwise related. Different models of different types (e.g., general vs. specific) can have different features (e.g., data variables), but can share the same number of variables or be otherwise distinct or related.

Figure 9:
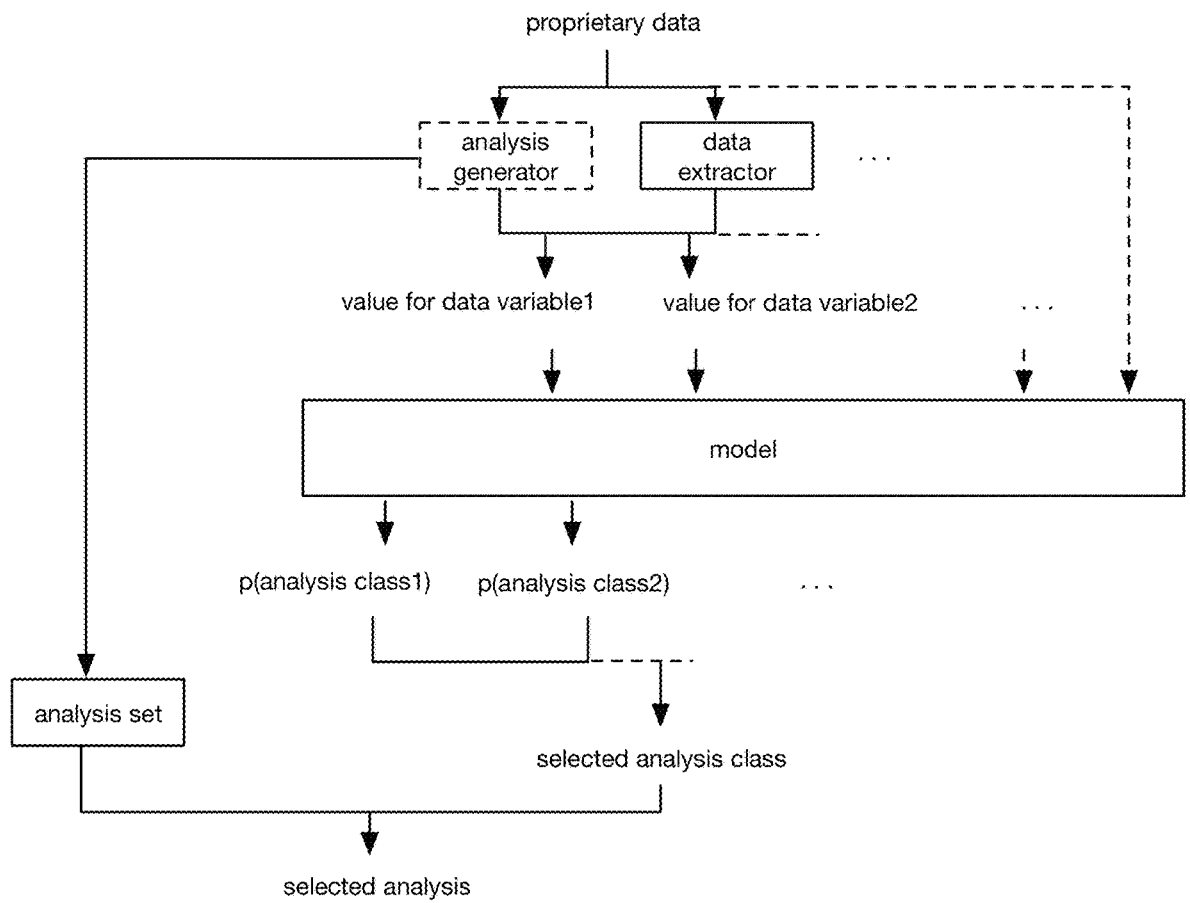
FIG. 9 is a schematic representation of a second illustrative example of a model used to select an analysis.

In a second illustrative example (example shown in FIG. 9), each model can include a multi-class classifier that outputs an analysis class selection, or probabilities for each of the plurality of analysis classes.

Figure 10:
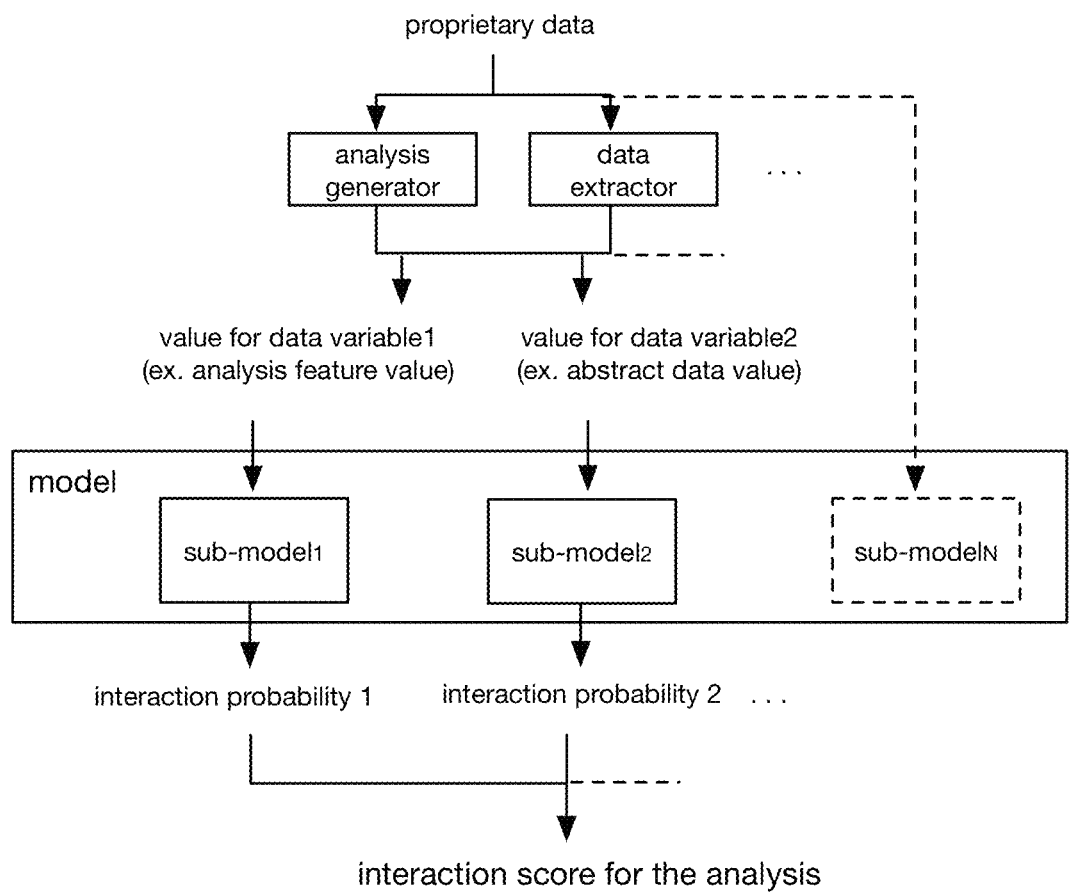
FIG. 10 is a schematic representation of a third illustrative example of a model used to generate an interaction score for an analysis.

In a third illustrative example, each model can include a set of single-class sub-models or classifiers (e.g., one for each analysis class, one for each feature, etc.) that outputs an interaction probability. When the classifiers output probabilities for an analysis class, the analysis class with the highest probability can be selected. When the classifiers output interaction probabilities based on a feature value (example shown in FIG. 10), the individual probabilities can be combined (e.g., summed) to generate a score for each analysis, wherein the analysis with the highest score(s) can be selected for presentation.

However, the models can be otherwise constructed.

Each model that is used in selecting the analysis preferably generates a score. Each analysis of the analysis set is preferably associated with a score (e.g., probability of interaction, given the data variable's value, based on historical interaction patterns with stories derived from data having the data variable's value). However, additionally or alternatively, the score can be associated with a particular ordering of the analysis set (e.g., a score for each order index-analysis combination), the analysis set, the data and/or abstracted data, a subset of the analysis set, and/or with any suitable content. The selected analysis preferably corresponds to the analysis associated with the highest score. However, the selected analysis can correspond to any analysis(es) from the analysis set with a score greater than a threshold, random analysis(es) from the analysis set (e.g., selected randomly from a curated subset of the analysis set such as analyses with a threshold score, randomly selected when two or more analyses have the same score, etc.), an ordering of the analysis set (e.g., organizing the analysis set from the highest scoring analysis to the lowest scoring analysis), and/or otherwise be selected based on the score.

In variants when two or more models are used to select an analysis of the analysis set, the analysis can be selected based on the overall score (e.g., the sum of the score generated by each of the models), the average score, the median score, a weighted score, the highest value score (of the set of scores), the lowest value score (of the set of scores), a combined score (e.g., a weighted score), voting between the models, based on the types of models used, and/or otherwise selected based on the outputs of the models.

Each score is preferably associated with a probability that the viewer (e.g., subscriber, user class, etc.) will interact (e.g., positively interact with, negatively interact with, etc.) the tailored information (e.g., selected analysis or analyses). In an illustrative example of this embodiment, when the model corresponds to a set of probability distributions, the interaction probability can be derived from (e.g., calculated, cross-correlated, selected from a chart, determined using a neural network, etc.) the probability distributions. However, additionally or alternatively, the score can be associated with a quality of the analysis (e.g., a confidence that the analysis is interesting), an impact of the analysis (e.g., more likely to select an analysis that is predicted to have a large impact, where the model or an alternative model additionally predicts an impact of the analysis), a veracity of the analysis (e.g., a confidence that the analysis is correct), and/or associated with any metric of the analysis or analysis set.

In an illustrative example, S240 may deploy the general model and the specific model in parallel. In this illustrative example, the general model may be deployed in an online (live) state in which inferences and predictions are generated and may be used to inform an operation of a story feed component of the service. The specific model may be deployed in an offline (non-live) state or training mode (e.g., as described in more detail below), which may include a training phase for the specific machine learning model and/or a validation phase. Accordingly, predictions and/or inferences of the specific machine learning in an offline state may not be used to inform an operation of the story feed component of the service.

Additionally or alternatively, S240 may include switching the specific model from an offline state to an online state based on one or more training metrics and/or performance metrics of the specific model. This can be performed automatically, manually, or otherwise performed. That is, in one or more embodiments, S240 may evaluate one or more metrics of the specific model relative to one or more training and/or performance thresholds. Based on a result of the assessment of a readiness of the specific model, S240 may function to (automatically) switch the specific model from an offline state to an online state. In some embodiments, for instance when the specific model has achieved a threshold training or performance metric (that can be the same as of different from the threshold to switch the specific model on), S240 can optionally switch the general model from the online state to an offline state.

Presenting the selected analysis, as recited in Block S250, functions to present tailored information (e.g., the analysis selected in S240) from the analysis set to the subscriber and/or user. The tailored information can be presented as part of a story feed (e.g., as disclosed in U.S. Pat. No. 10,313,466), at a subscriber client, at a platform client, on a user device (e.g., using an application running on the user device such as a smart phone, smart watch, laptop, personal computer, smart glasses, etc.), and/or otherwise present the information to the subscriber. S250 can include presenting the tailored information, the analysis set (e.g., organized such as according to the score, randomly, as generated, etc.), and/or any suitable information.

Presenting the selected analysis can include detecting one or more interactions with the selected analysis, which functions to determine how the subscriber(s) interact with the information particularly but not exclusively the tailored information. The interactions are preferably detected in the subscriber domain, but can be detected in the platform domain and/or in any domain. The interactions are preferably transmitted to (and stored and/or processed by) the platform domain, but can be transmitted to, stored and/or processed in the subscriber domain and/or any suitable domain.

Figure 7:
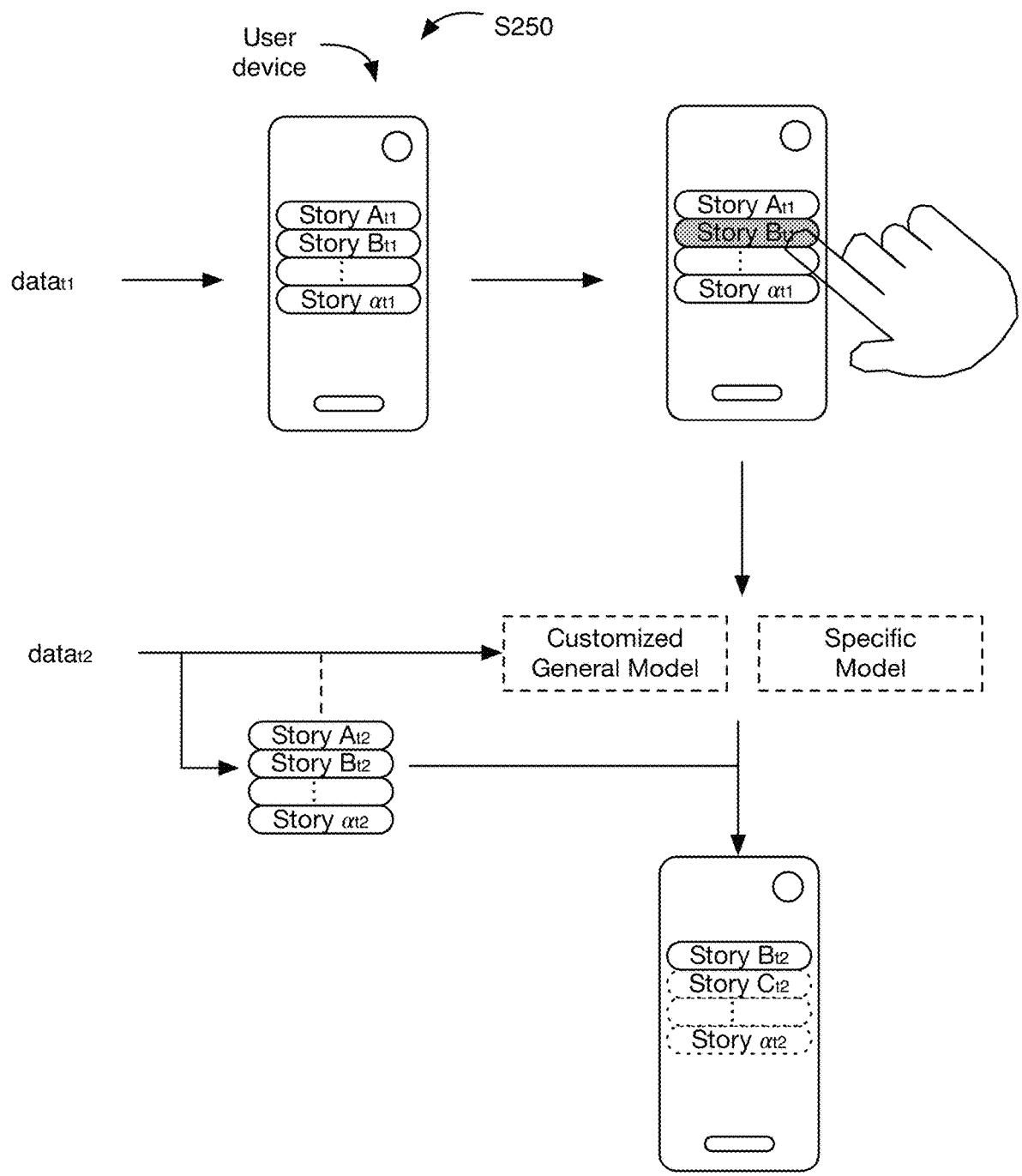
FIG. 7 is a schematic representation of an example of a user interaction and the use of a user interaction to update or train a customized general model and a specific model.

The interactions are preferably used (e.g., in conjunction with the selected stories) to train (and/or otherwise improve) the models to improve the selection of tailored information (e.g., to better select tailored information that the subscriber will interact with, for example as shown in FIG. 7). In some variants, interactions can be classified as positive interactions, negative interactions, and/or neutral interactions. However, the interactions can be unclassified and/or classified in any manner. Generally, although not exclusively, positive interactions are associated with analyses that should be selected more frequently while negative interactions are associated with analyses that should be presented less frequently. However, any interactions can correspond to analyses that should be presented more or less frequently. Examples of interactions can include: clicking (on a story), selecting, liking (or disliking), voting on (e.g., upvoting, down voting), commenting on, downloads, swiping, reading, browsing, dismissing, reacting to, sharing, an amount of time the analysis remains presented, and/or any suitable interactions. Any interactions can be used to train or otherwise improve the models. Different interactions (e.g., types of interactions) can have the same or different weights for training the model(s).

Generating a customized general model functions to train the general model to better tailor information for a specific subscriber (and/or set of subscribers). Generating a customized general model can be performed by a modelling system and/or any component of an intelligence system or other suitable system. Generating a customized general model is preferably performed in the subscriber domain, but can be performed in the platform domain and/or in any suitable domain.

The customized general model is preferably generated based on interactions of one or more users (preferably, but not exclusively, of the same user class) associated with the subscriber and the presented analysis. The customized general model can also be generated based on the data (and/or abstract data) used to generate the information that was interacted with, and/or the data (and/or abstract data) used to generate the analysis(es) (e.g., presented and/or not presented) that was not interacted with. However, the customized general model can additionally or alternatively be generated based on a meta-analysis of the analyses, using unsupervised learning, and/or otherwise be updated.

The customized general model can be updated (e.g., trained or retrained) according to a schedule, with a given frequency (e.g., every day, every week, every fortnight, every month, every quarter, every half-year, every year, etc.), responsive to a change (e.g., a change in the model, a change in an entity structure, a change in the number or types of user classes, etc.), randomly, responsive to a trigger (e.g., a request to update the model, receipt of a user interaction), and/or with any timing.

In some embodiments, the customized general model can replace the general model for generating the tailored information (e.g., for the user class, for the subscriber, for a subscriber group, for all subscribers, etc.). However, the customized general model and the general model can each be used to generate the tailored information and/or the customized general model and the general model can be used in any manner. For example, the general model can be used to monitor the customized general model.

Generating a specific model functions to generate and/or update a subscriber specific model. In one or more embodiments, the specific model is only accessible to a single subscriber. In these embodiments, the specific model is able to provide tailored information based on subscriber data (e.g., proprietary data). However, the specific model may be generated to be specific for a given user class, a given market sector, and/or other specific subscriber characteristics. The specific model is preferably generated in the subscriber domain (e.g., at a subscriber client), but can be generated in the platform domain (e.g., at a platform client) and/or in any suitable domain. The specific model is preferably generated by a modelling system, but can be generated by any component of an intelligence system or by any suitable system.

In a specific example, the specific model can be generated (or updated) by acquiring a training data set that includes subscriber data, presented information, and subscriber interactions with the presented information; and training the specific model to select an analysis that the subscriber is more likely to interact with and/or to deprioritize (or not select) analyses that the subscriber is less likely to interact with. However, the specific model can be trained in any manner.

Figure 3:
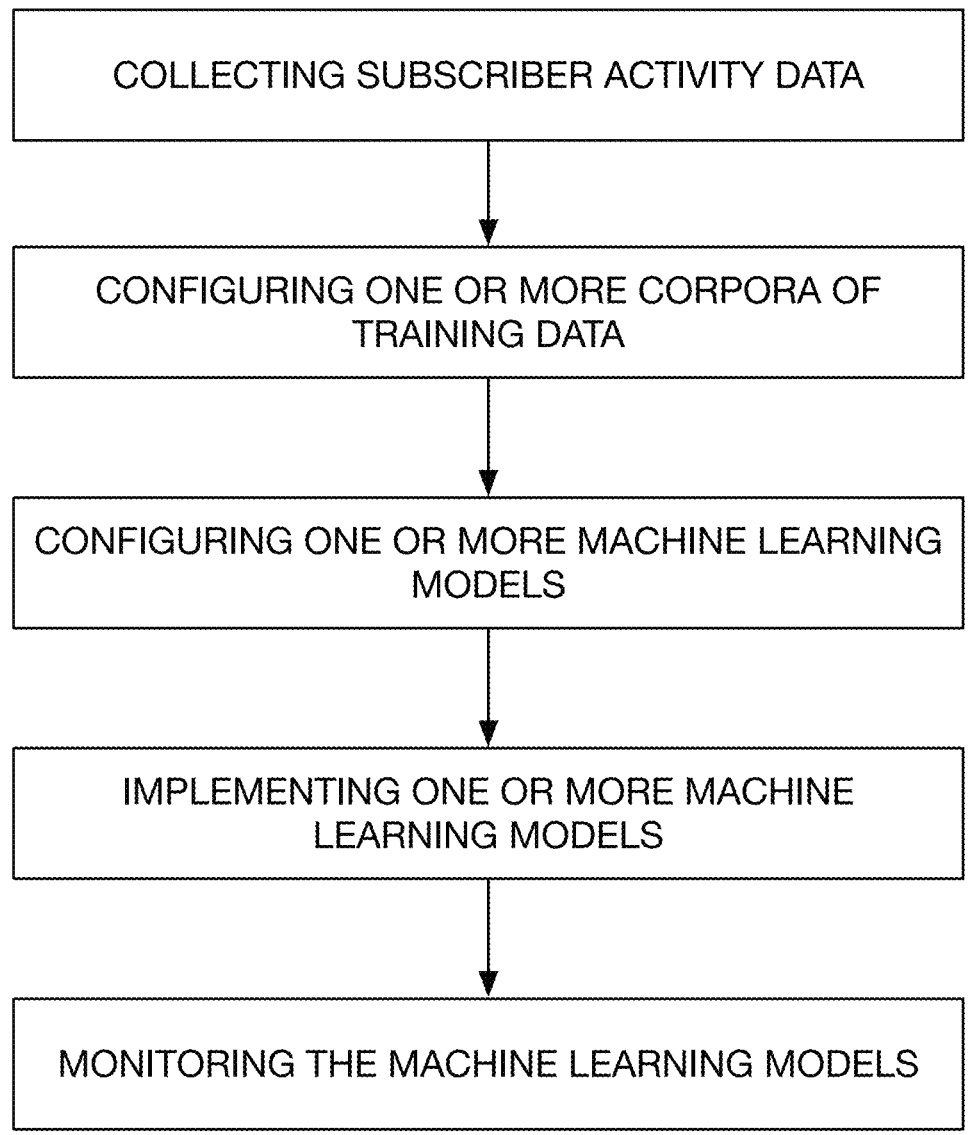
FIG. 3 illustrates a schematic representation of an example of generating a model.

As shown for example in FIG. 3, monitoring the models (e.g., the machine learning models) functions to monitor an operation of the models (e.g., the general model, the customized general model, the specific model, etc.). Additionally, or alternatively, monitoring the models may function to identify or compute one or more performance metrics of the model and assess a performance of the model based on the performance metrics.

In one or more embodiments, monitoring the models may function to monitor the model(s) for drift. In such embodiments, monitoring the models can include computing a drift metric based on a calculated difference between the predictions of the model and an assessed interaction of a subscriber with one or more services of the service for which the predictions are made. However, the drift metric can additionally or alternatively be derived based on the a comparison between tailored information and/or subscriber interactions with analyses selected using a first model (such as a general model, customized general model, specific model) and a second model (such as a general model, customized general model, specific model, the same as or distinct from the first model, etc.), and/or otherwise be derived. For instance, if the model predicts that a subscriber may interact with a predicted tailored information (e.g., set of computer-generated stories) but the subscriber does not interact with or minimally interacts with the predicted set of stories, monitoring the models may compute a drift value sufficient to potentially indicate a poor performance of the model. Conversely, if a subscriber sufficiently interacts with the predicted set of stories, monitoring the models may function to calculate a low or minimal drift value. In such embodiments, monitoring the models may function to assess the computed drift value against a predetermined and/or dynamic drift threshold such that if the computed drift value does not satisfy and/or is below the drift threshold, monitoring the models may indicate that a performance of the model may be adequate.

It shall be noted that while monitoring the models preferably monitors the specific model, monitoring the models may additionally or alternatively monitor the general model, the customized general model, and/or any model in a similar manner.

It shall be noted that monitoring the models may measure and/or monitor any suitable performance metric including, but not limited to, a predictive accuracy metric, a predictive efficiency metric, and the like.

Additionally, or alternatively, monitoring the models may adjust or change a state of the model based on monitoring one or more performance metrics of the model. Specifically, in one or more embodiments, monitoring the models may function to switch an online/offline state of the model based on the one or more performance metrics of the model.

In a first implementation, monitoring the models may function to switch a state of the specific model from offline to online based on one or more performance and/or operational metrics. For instance, in one embodiment, monitoring the models may function to compute a training metric for the specific model indicating a level of training that the specific model has undergone. In such embodiment, monitoring the model may assess the training metric for the specific model against a training threshold. In the circumstance that the training metric satisfies and/or exceeds the training threshold, monitoring the models may function to automatically switch a state of the specific machine learning model from offline to online.

Additionally, or alternatively, monitoring the models may additionally switch a related but distinct general model from online to offline for a specific subscriber for which the specific model was activated. Alternatively, monitoring the model may function to maintain an online status of the general model but only inform a story feed component of the service with the predictions and/or inferences of the specific model.

Additionally, or alternatively, as discussed above, monitoring the model may function to monitor and/or assess one or more performance metrics of an online model. In one example, monitoring the model may function to compute a drift value based on a performance of the model. In such example, monitoring the model may function to assess the drift value for the model against a drift threshold. If the drift value meets or exceeds the drift threshold (indicating a poor performance), monitoring the model may function to automatically switch a state of the model from online to offline. Contemporaneously, or simultaneously, monitoring the model may switch a state of a second model from offline/inactive to online/active, such that the predictions of the second model inform an operation of a story feed component of the service in lieu of the model.

In an illustrative example, monitoring the models can be performed by an intelligence service such as disclosed in U.S. Pat. No. 10,313,466, where the insights and information can correspond to the behavior and/or performance of one or more models. However, monitoring the models can be otherwise performed.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for presenting a story to a subscriber comprising:
   receiving data associated with the subscriber;
   determining a set of stories based on the subscriber data;
   extracting abstract parameters associated with the subscriber data;
   selecting a story from the set of stories based on a general model and the abstract parameters, wherein the general model is generated from:
      abstracted parameters extracted from data from a plurality of subscribers, wherein the plurality of subscribers does not share data;
      stories for each of the plurality of subscribers; and
      user interactions with the stories for each of the plurality of subscribers;
   training the general model using the abstracted parameters associated with the subscriber and subscriber interactions with the selected analysis to generate a customized general model, wherein the customized general model is subscriber specific, wherein the selected stories are subsequently selected based on the customized general model; and
   presenting the selected story to a user view associated with the subscriber.

2. The method of claim 1, wherein the data is abstracted by a client in a subscriber domain; and wherein the general model is generated in a platform domain.

3. The method of claim 1, wherein the abstracted parameters are derived from, but do not include, the subscriber data.

4. The method of claim 3, wherein selecting the story further comprises selecting the story based on a specific model and the subscriber data.

5. The method of claim 4, further comprising determining a combined score based on a story score generated by the general model based on the abstracted parameters and a story score generated by the specific model based on the subscriber data, wherein the selected story is determined based on the combined score.

6. The method of claim 1, wherein the general model comprises a set of probability distributions, wherein the general model determines a score for each story of the set of stories, wherein the score is determined based on a set of weights associated with the probability distributions.

7. The method of claim 6, wherein the score corresponds to a probability of a user interaction with the story.

8. The method of claim 7, wherein the probability of a user interaction is derived from a set of probability distributions.

9. The method of claim 1, wherein the subscriber interactions include opening a story.

10. A system for selecting an analysis to present to a subscriber, the system comprising:
a subscriber client configured to:
receive data associated with the subscriber;
determine an analysis set based on the subscriber data;
extract abstract parameters from the subscriber data, wherein the abstract parameters do not identify the subscriber;
select an analysis from the analysis set based on a general model and the abstract parameters, wherein the subscriber client receives the general model from a platform client; and
present the selected analysis to the subscriber;
wherein the platform client is configured to generate the general model based on training data associated with a plurality of subscribers, wherein the plurality of subscribers do not share data.

11. The system of claim 10, wherein the training data comprises:
abstract parameters associated with data from the plurality of subscribers;
analysis set associated with each subscriber of the plurality of subscribers; and
user interactions with the analysis set for each of the plurality of subscribers.

12. The system of claim 10, wherein the abstract parameters are derived from, but do not include, the subscriber data.

13. The system of claim 12, wherein the subscriber client is further configured to select the analysis based on a specific model and the subscriber data.

14. The system of claim 13, wherein the abstract parameters used by the general model to select the analysis are not extracted from the subscriber data used by the specific model to select the analysis.

15. The system of claim 13, wherein selecting the analysis comprises determining a combined score by combining an analysis score generated by the general model based on the abstract parameters and an analysis score generated by the specific model based on the subscriber data, wherein the selected analysis is determined based on the combined score.

16. The system of claim 10, wherein the general model comprises a set of probability distributions, wherein the general model determines a score for each analysis of the analysis set, wherein the score is determined based on a set of weights associated with the probability distributions.

17. The system of claim 16, wherein the score corresponds to a probability of a user interaction with the analysis.

18. The system of claim 10, wherein the subscriber client is further configured to:
record user interactions with the selected analysis; and
train the general model using the abstracted parameters associated with the subscriber and the user interactions with the selected analysis to generate a customized general model, wherein the customized general model is subscriber specific, wherein the selected analysis is selected based on the customized general model.

19. The system of claim 18, wherein the user interactions comprise liking the selected analysis.

20. A method for presenting a story to a subscriber comprising:
receiving data associated with the subscriber;
determining a set of stories based on the subscriber data;
extracting abstract parameters associated with the subscriber data;
selecting a story from the set of stories based on a general model, a specific model, the subscriber data, and the abstract parameters;
determining a combined score based on a story score generated by the general model based on the abstracted parameters and a story score generated by the specific model based on the subscriber data, wherein the selected story is determined based on the combined score; and
presenting the selected story to a user view associated with the subscriber;
wherein the general model is generated from:
abstracted parameters extracted from data from a plurality of subscribers, wherein the plurality of subscribers does not share data, wherein the abstracted parameters are derived from, but do not include, the subscriber data;
stories for each of the plurality of subscribers; and
user interactions with the stories for each of the plurality of subscribers.

* * * * *